(12) United States Patent
Shin et al.

(10) Patent No.: US 11,305,963 B2
(45) Date of Patent: Apr. 19, 2022

(54) CABLE LAYING METHOD USING CABLE LAYING APPARATUS CAPABLE OF CHANGING DIRECTION OF CABLE

(71) Applicant: Tai Han Electric Wire Co., Ltd., Anyang-si (KR)

(72) Inventors: Dong Joo Shin, Seoul (KR); Chang Seok Han, Seoul (KR); Je Hoon Kim, Yongin-si (KR); Ik Soon Yim, Anyang-si (KR)

(73) Assignee: TAI HAN ELECTRIC WIRE CO., LTD., Anyang-si (KR)

( * ) Notice: Subject to any disclaimer, the term of this patent is extended or adjusted under 35 U.S.C. 154(b) by 261 days.

(21) Appl. No.: 16/682,736

(22) Filed: Nov. 13, 2019

(65) Prior Publication Data
US 2021/0016992 A1    Jan. 21, 2021

(30) Foreign Application Priority Data

Jul. 16, 2019    (KR) ........................ 10-2019-0085869

(51) Int. Cl.
*B65H 75/44*    (2006.01)
*B65H 75/42*    (2006.01)

(52) U.S. Cl.
CPC ....... *B65H 75/4407* (2013.01); *B65H 75/425* (2013.01); *B65H 75/4413* (2013.01)

(58) Field of Classification Search
CPC ...... B65H 49/06; B65H 57/18; B65H 59/387; B65H 57/006; B65H 49/24; B65H 2701/34; B65H 49/321; B65H 57/14; B65H 49/324; B65H 59/388; B65H 61/005; B65H 75/403
See application file for complete search history.

(56) References Cited

U.S. PATENT DOCUMENTS

| | | | | |
|---|---|---|---|---|
| 4,454,999 A | * | 6/1984 | Woodruff | B65H 49/34 242/388.7 |
| 4,789,108 A | * | 12/1988 | Recalde | F16L 1/202 242/388.7 |
| 4,890,957 A | * | 1/1990 | Rinas | B65H 49/06 242/386 |
| 5,641,246 A | * | 6/1997 | Rinas | B65H 49/06 405/174 |

(Continued)

*Primary Examiner* — William A. Rivera
(74) *Attorney, Agent, or Firm* — Novick, Kim & Lee, PLLC; Jae Youn Kim

(57) ABSTRACT

Provided is a cable laying method using a cable laying apparatus capable of changing a direction of a cable, the cable laying method including: (A) installing a frame unit; (B) arranging a trailer bogie loaded with a cable drum inside the frame unit without additional loading work; (C) rotating the cable drum, which is loaded in the trailer bogie, by an under roller part; (D) changing a withdrawal direction of a cable unwound from the cable drum by a traverse part of the frame unit; (E) supplying the cable, the withdrawal direction of which is changed by the traverse part, to a cable unwinding part located at the rear of the traverse part; and (F) supplying the cable passing through the cable unwinding part to a required place through a curvature guide part located at the rear of the cable unwinding part, wherein the traverse part is configured to change a direction of the cable withdrawn in a radial direction of the cable drum to an axial direction of the cable drum.

9 Claims, 14 Drawing Sheets

(56) References Cited

U.S. PATENT DOCUMENTS

| | | | | |
|---|---|---|---|---|
| 6,276,503 | B1* | 8/2001 | Laughlin, Jr. | B65H 75/403 |
| | | | | 191/12.2 A |
| 6,419,180 | B1* | 7/2002 | Gmeiner | B65H 49/34 |
| | | | | 242/420.6 |
| 6,438,792 | B1* | 8/2002 | Cappellotto | E03F 7/10 |
| | | | | 15/302 |
| 7,028,781 | B2* | 4/2006 | Hill | B65H 75/425 |
| | | | | 166/384 |
| 7,566,024 | B2* | 7/2009 | Krise | B60P 1/6463 |
| | | | | 242/397.1 |
| 8,613,426 | B1* | 12/2013 | Holland | H02G 1/06 |
| | | | | 254/134.3 FT |
| 8,864,417 | B2* | 10/2014 | Tkaczyk | F16L 1/19 |
| | | | | 405/168.3 |
| 10,233,063 | B2* | 3/2019 | Gathman | B66F 9/18 |
| 10,301,149 | B2* | 5/2019 | Franklin-Hensler | B65H 49/24 |
| 2007/0119997 | A1* | 5/2007 | Boon | B65H 75/4407 |
| | | | | 242/159 |
| 2011/0226885 | A1* | 9/2011 | Fries | B21C 49/00 |
| | | | | 242/420 |
| 2013/0251456 | A1* | 9/2013 | Haugen | B65H 75/425 |
| | | | | 405/166 |
| 2014/0070045 | A1* | 3/2014 | Robinson | B65H 57/18 |
| | | | | 242/566 |
| 2014/0086688 | A1* | 3/2014 | Hull | H02G 9/02 |
| | | | | 405/177 |
| 2017/0342700 | A1* | 11/2017 | Wiedemann | B65H 57/14 |
| 2019/0237957 | A1* | 8/2019 | Kiely | B65H 75/4407 |
| 2020/0048030 | A1* | 2/2020 | Arzola | B65H 49/24 |
| 2021/0015022 | A1* | 1/2021 | Hall | E02F 3/3609 |
| 2021/0095534 | A1* | 4/2021 | Teichrob | B65H 75/4473 |

* cited by examiner

CABLE LAYING METHOD USING CABLE LAYING APPARATUS CAPABLE OF CHANGING DIRECTION OF CABLE

CROSS-REFERENCE TO RELATED APPLICATION

This application claims priority to and the benefit of Korean Patent Application No. 2019-0085869, filed on Jul. 16, 2019, the disclosure of which is incorporated herein by reference in its entirety.

BACKGROUND

1. Field of the Invention

The present invention relates to a cable laying method, and more particularly, to a cable laying method using a cable laying apparatus capable of changing a direction of a cable, in which a cable is laid in an axial direction of a cable drum without additional unloading work to minimize a road occupancy space in a cable laying process, unlike in a cable laying apparatus of a related art for laying a cable in a radial direction of a cable drum.

2. Discussion of Related Art

With continuous economic growth and development, the demand for ultra-high-voltage cables is gradually increasing due to an increase in power consumption and thus there is a need for large-scale and long-span ultra-high-voltage cables. As large-scale and long-span ultra-high-voltage cables are being developed, cable drums for transporting the cables produced at a manufacturing plant to a site at which the cables are to be installed are becoming larger in size.

In order to achieve a large-scale cable drum for transporting an ultra-high-voltage cable, a height or width of the cable drum should be increased. However, general roads are used to transport the cable drum and thus the size of the cable drum is generally increased by increasing the height thereof so that the width of the cable drum does not exceed the width of the road.

However, the cable drum should pass over bridges or overpasses for land transportation and thus a maximum height thereof is limited to four to five meters. Therefore, a related art of increasing a size of a cable drum by increasing the height of the cable drum while maintaining the width thereof has limit.

User demand for large-scale and long-span cables may be more effectively satisfied by increasing the width of a cable drum than by increasing the height of the cable drum.

FIG. 1 is a diagram schematically illustrating an example of a process of laying a cable in a radial direction of a cable drum according to a related art.

As illustrated in FIG. 1, when a cable C is laid in a radial direction of a cable drum D, many road lanes may be occupied during laying of the cable C, thereby causing many problems in road traffic. That is, there are many restrictions on work of laying cable C.

Therefore, various researches and developments are being conducted on a cable laying apparatus for satisfying a new cable laying method of achieving large-scale and long-span cables while minimizing road occupancy in a cable laying process.

SUMMARY OF THE INVENTION

The present invention provides a cable laying method using a cable laying apparatus capable of changing a direction of a cable to lay the cable in an axial direction of a cable drum rather than a radial direction of the cable drum so that a large-scale and long-span cable drum may be achieved while minimizing a road occupancy space in a cable laying process to overcome limitations of existing cable laying apparatuses.

Technical aspects of the present invention are not limited thereto, and other technical aspects not mentioned herein will be clearly understood by those of ordinary skill in the art from the following description.

Provided is a cable laying method using a cable laying apparatus capable of changing a direction of a cable, the cable laying method including: (A) installing a frame unit; (B) disposing a trailer bogie loaded with a cable drum inside the frame unit without additional loading work; (C) rotating the cable drum, which is loaded in the trailer bogie, by an under roller part; (D) changing a withdrawal direction of a cable unwound from the cable drum by a traverse part of the frame unit; (E) supplying the cable, the withdrawal direction of which is changed by the traverse part to a cable unwinding part located at the rear of the traverse part; and (F) supplying the cable passing through the cable unwinding part to a required place through a curvature guide part located at the rear of the cable unwinding part, wherein the traverse part is configured to change a direction of the cable withdrawn in a radial direction of the cable drum to an axial direction of the cable drum.

In one embodiment of the present invention, (A) may include (A1) moving the frame unit loaded on a cargo box of a truck to a site at which the cable is to be laid and (A2) extending lengths of a first unloading pillar part and a second unloading pillar part of the frame unit to support and fix the first unloading pillar part on the road surface and bring the second unloading pillar part into contact with the road surface.

In one embodiment of the present invention, after (A2), (A) may further include (A3) increasing a width of the frame unit to a predetermined width by movement of the second unloading pillar part.

In one embodiment of the present invention, after (A3), (A) may further include (A4) moving the truck while the width of the frame unit is increased; and (A5) extending a first lifting frame included in a first pillar part of the frame unit and a second lifting frame included in a second pillar part of the frame unit downward and adjusting a height of the frame unit to a predetermined height.

In one embodiment of the present invention, after (A5), A) may further include (A6) adjusting lengths of the first unloading pillar part and the second unloading pillar part to return to an original position thereof while the first lifting frame and the second lifting frame are fixed on the road surface.

In one embodiment of the present invention, (A3) may include adjusting the width of the frame unit to arrange the trailer bogie loaded with the cable drum in the frame unit.

In one embodiment of the present invention, during (D), the traverse part may be slidingly moved in a lengthwise direction of the frame unit and configured to change a withdrawal direction of the cable.

In one embodiment of the present invention, a cable sagging preventer provided at the rear of the frame unit may be unfolded about a rotation axis to support the cable in a state in which the traverse part is moved forward along the frame unit, and be folded about the rotation axis to prevent interference with the traverse part in a state in which the traverse part is moved backward along the frame unit.

In one embodiment of the present invention, a rear end of the traverse part may be located at a position higher than the cable unwinding part.

In one embodiment of the present invention, the cable unwinding part and a curvature guide part are installed in a moving vehicle.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
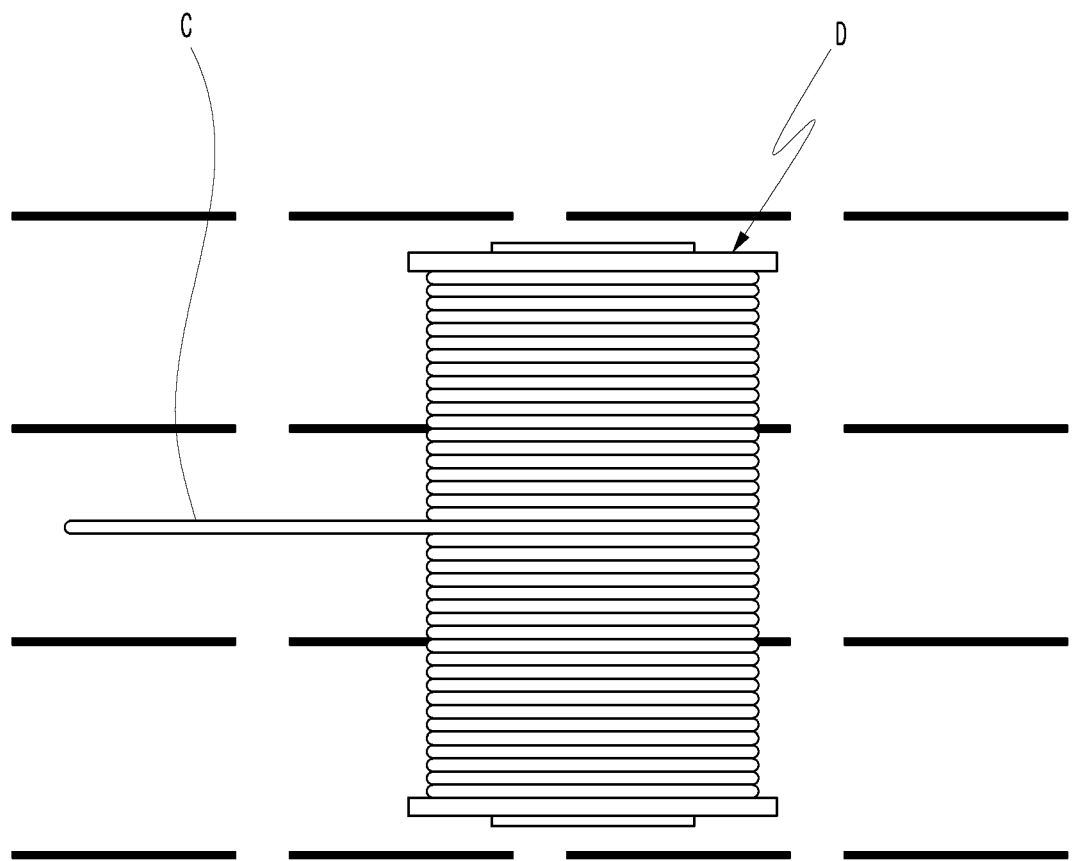
FIG. 1 is a diagram schematically illustrating a process of laying a cable in a radial direction of a cable drum according to a related art.

Hereinafter, the present invention will be described with reference to the accompanying drawings. However, the present invention may be embodied in many different forms and thus is not limited to the embodiments set forth herein. For clarity, parts not related to explaining the present invention are omitted in the drawings, and like elements are denoted by like reference numerals throughout the specification.

Throughout the specification, when a component is referred to as being "connected to" another component, it should be understood to mean that the component is "directly connected to" the other component or "indirectly connected" to the other component via another member therebetween. When a component is referred to as "including" another component, it should be understood to mean that the component may further include other components unless otherwise stated.

As used herein, the terms "on" and "below" indicate "on" and "below" a target member and should not be understood to necessarily mean above or below in a direction of gravity.

Embodiments of the present invention will be described in detail with reference to the accompanying drawings below.

Figure 2:
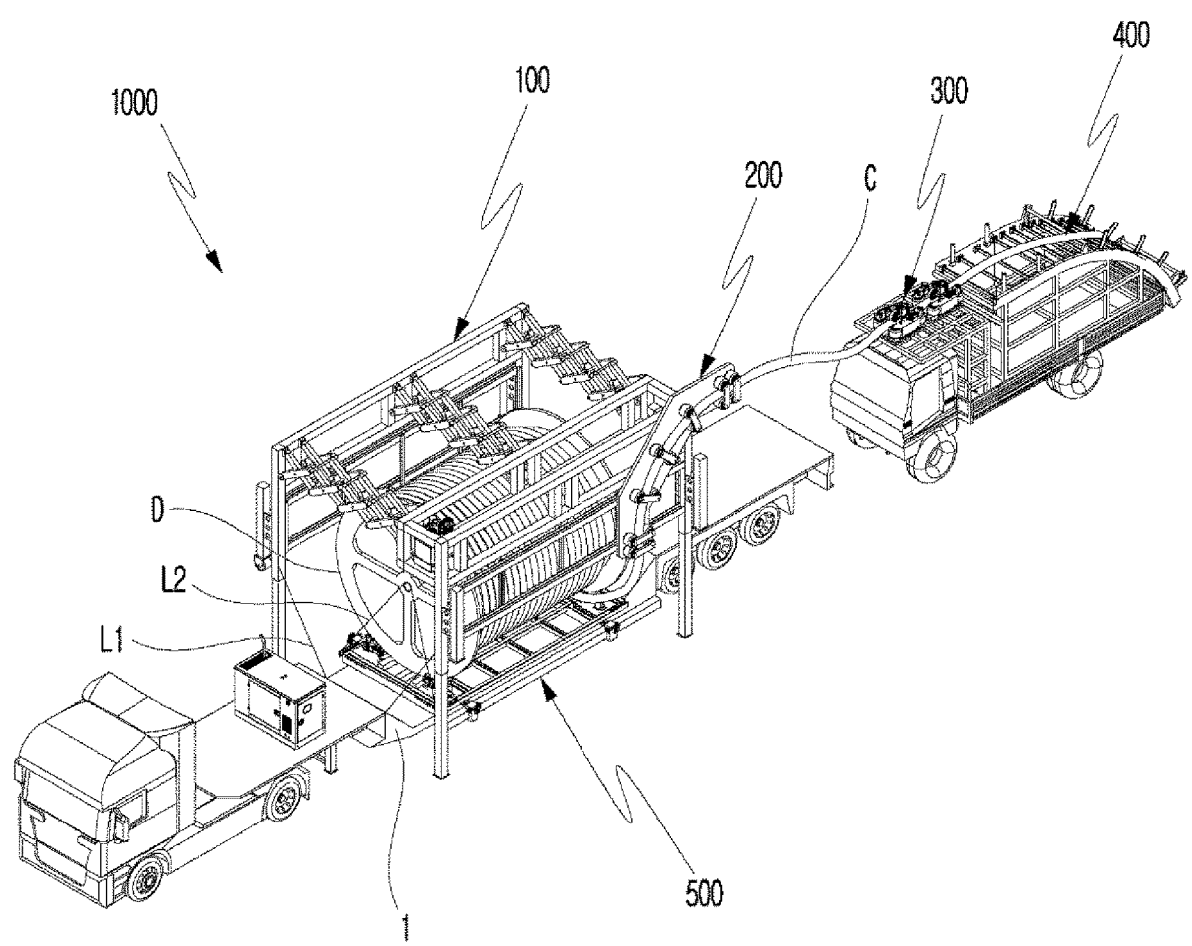
FIG. 2 is a schematic perspective view of a cable laying apparatus according to an embodiment of the present invention.
Figure 3:
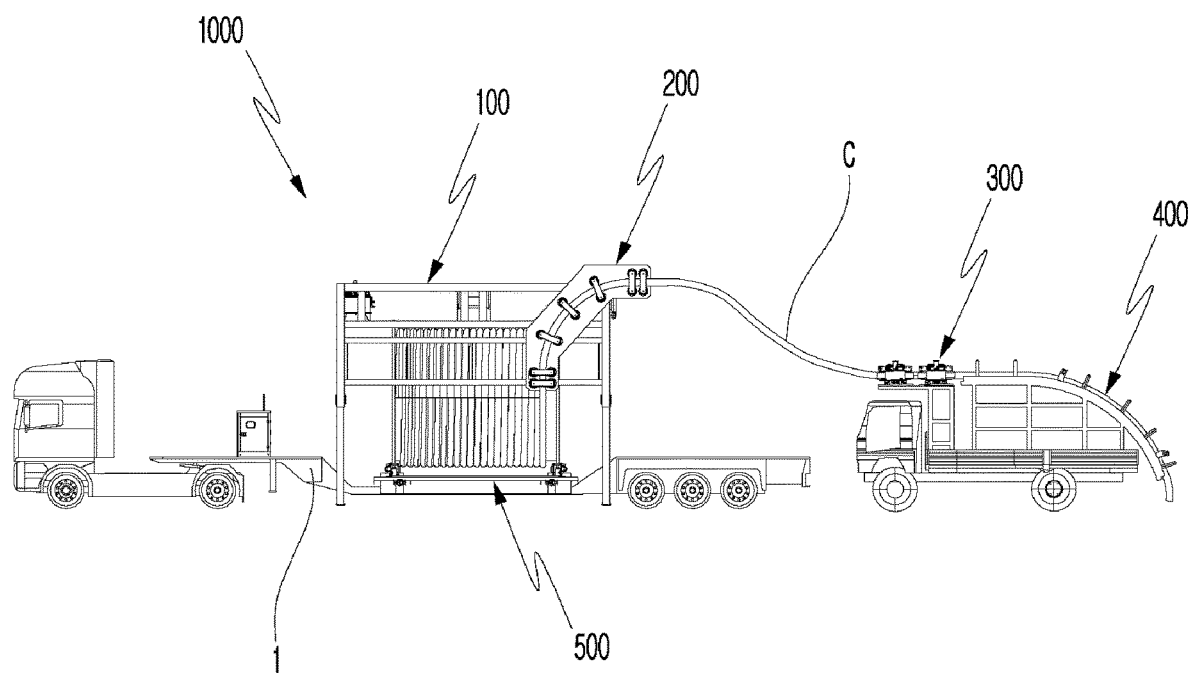
FIG. 3 is a side view of a cable laying apparatus according to an embodiment of the present invention.
Figure 4:
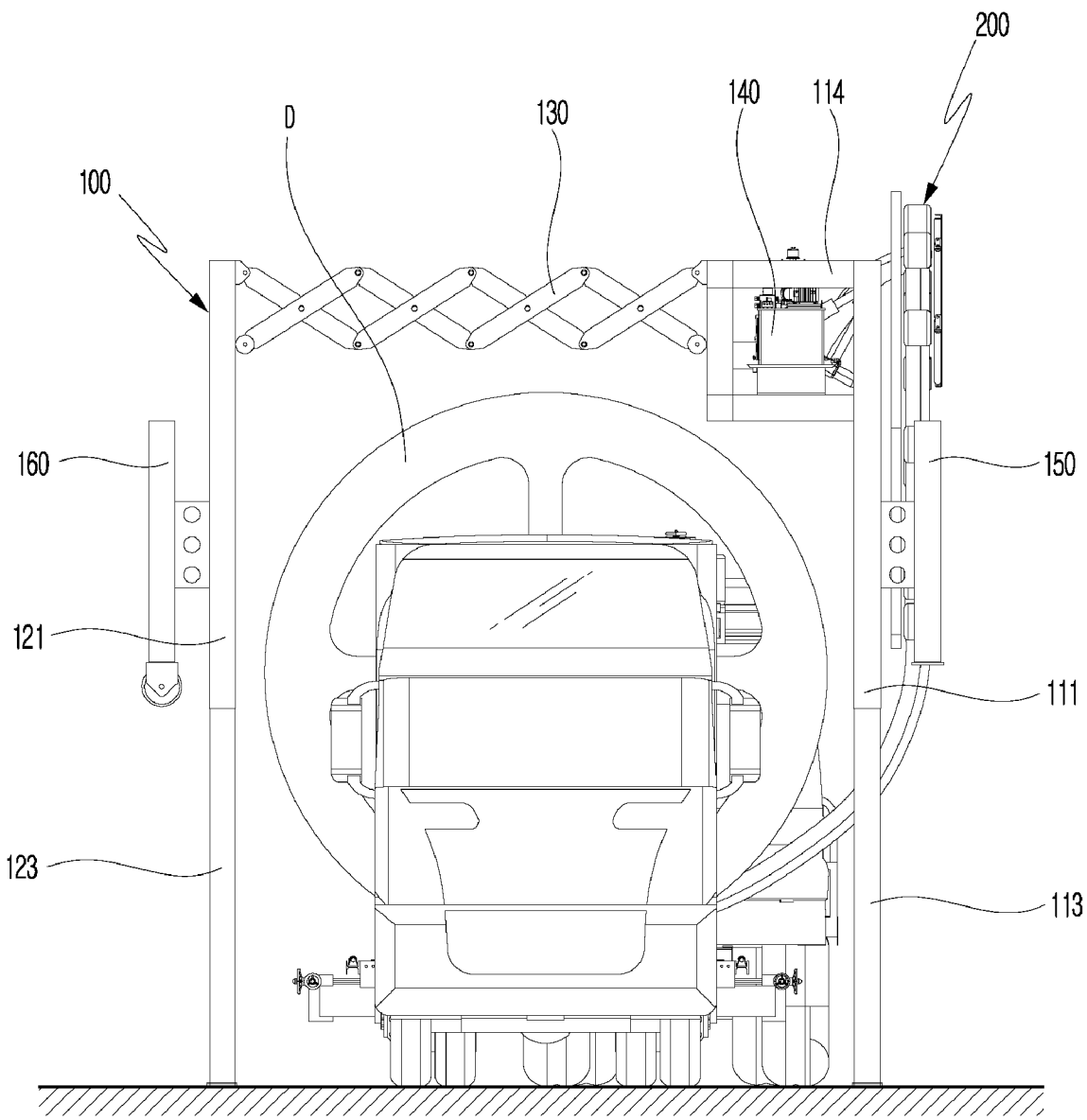
FIG. 4 is a front view of a cable laying apparatus according to an embodiment of the present invention.
Figure 5:
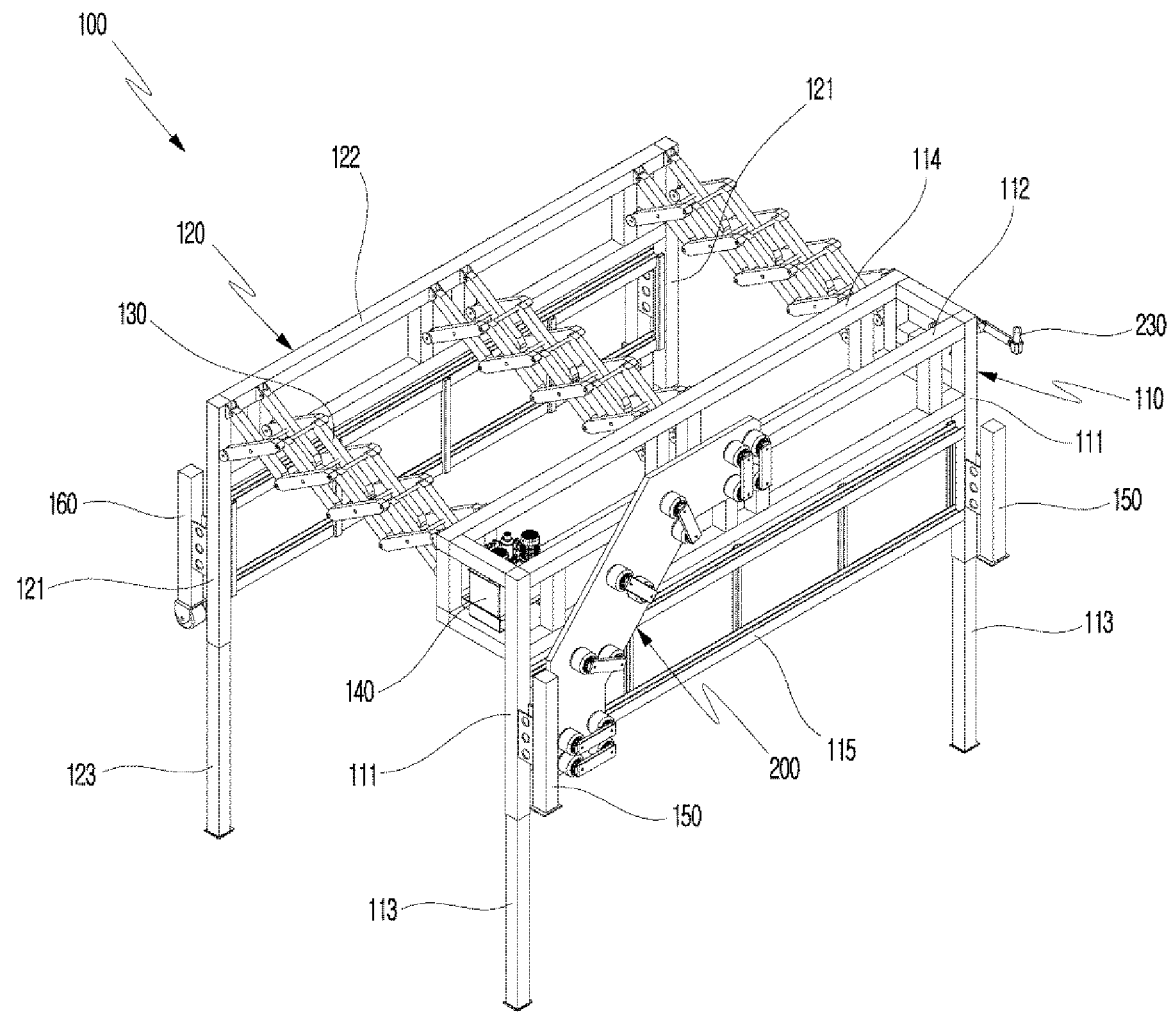
FIG. 5 is an operating state diagram illustrating a state in which a traverse part is moved forward along a moving rail part according to an embodiment of the present invention.
Figure 6:
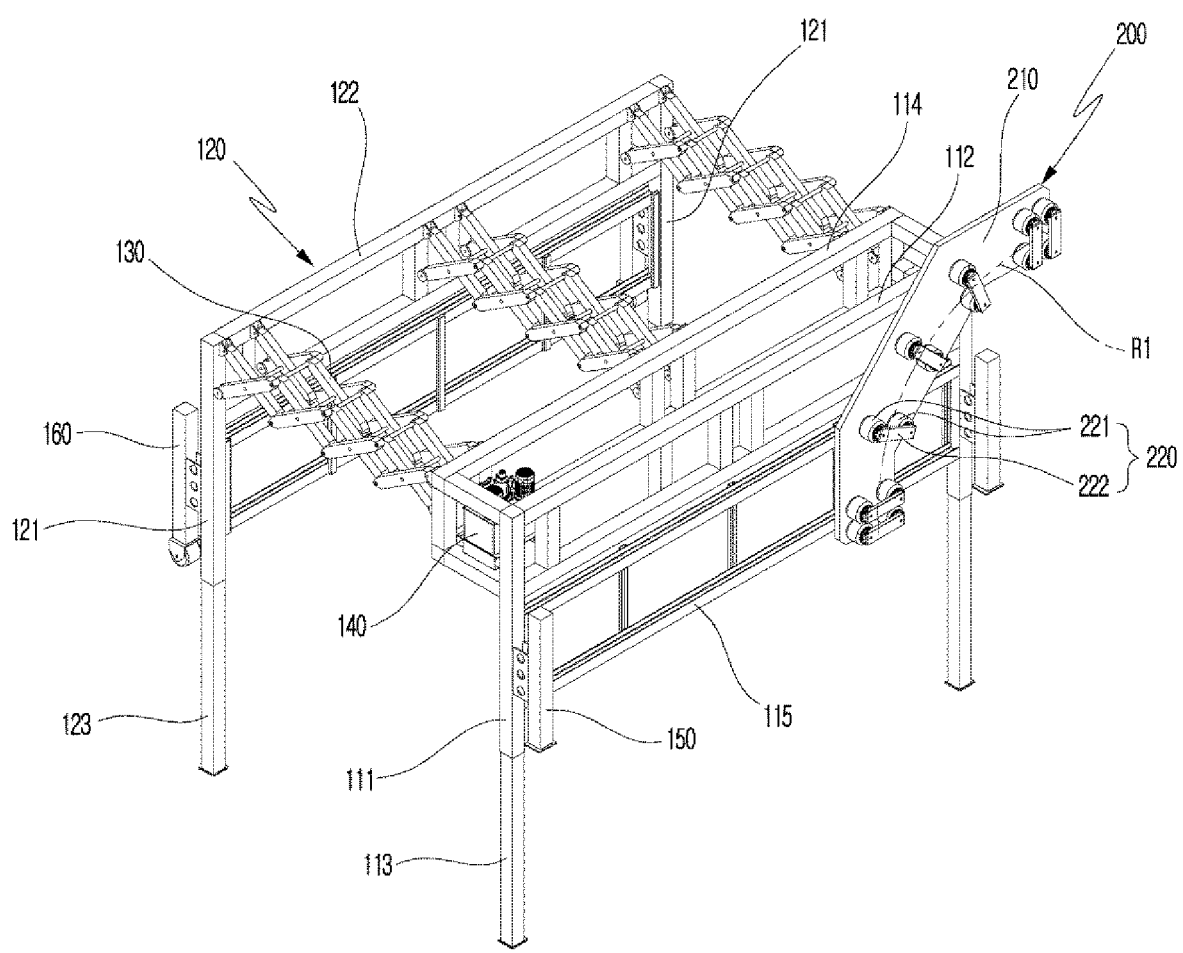
FIG. 6 is an operating state diagram illustrating a state in which the traverse part is moved backward along the moving rail part according to an embodiment of the present invention.
Figure 7:
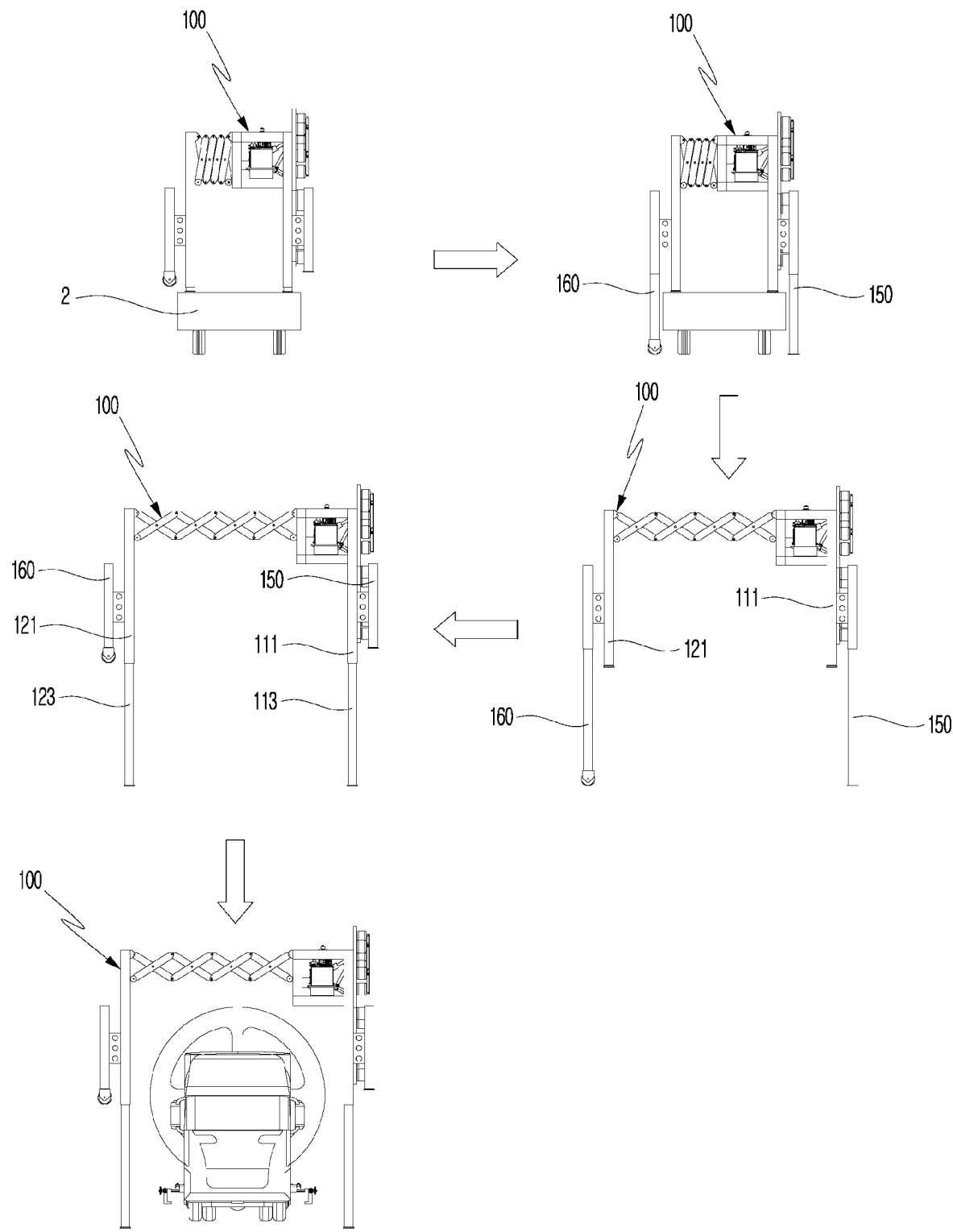
FIG. 7 is a diagram schematically illustrating a process of installing a frame unit according to an embodiment of the present invention.
Figure 8:
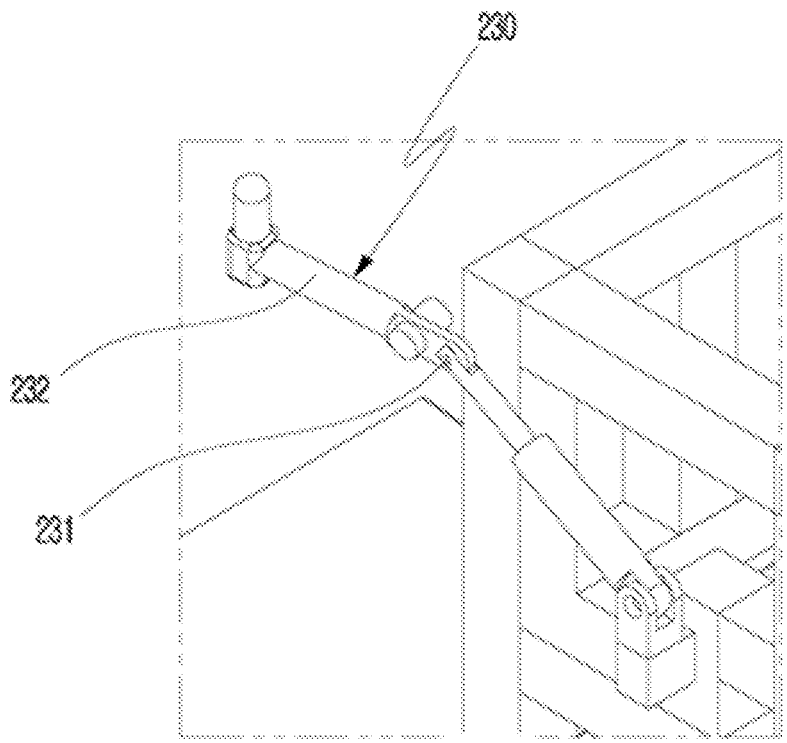
FIG. 8 is an operating state diagram illustrating an operating state of a cable sagging preventer according to an embodiment of the present invention.
Figure 8:
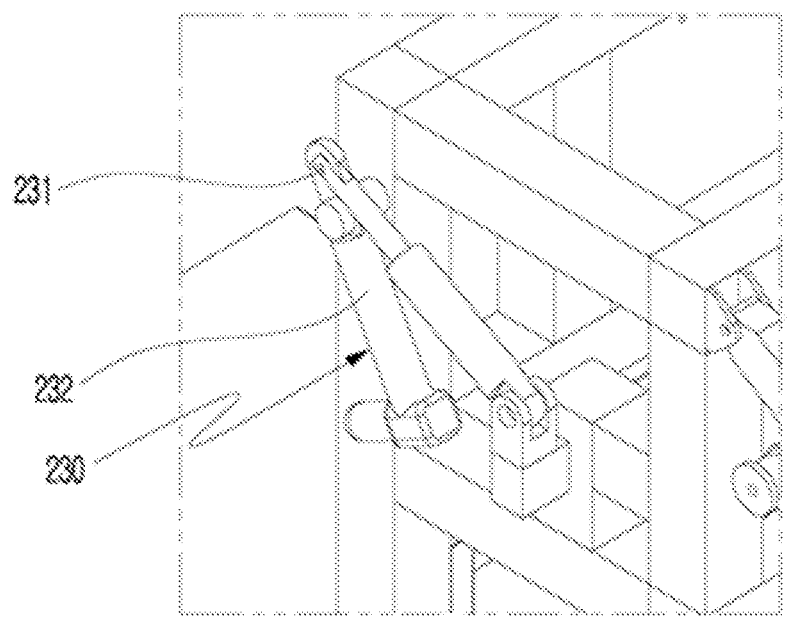
Figure 9:
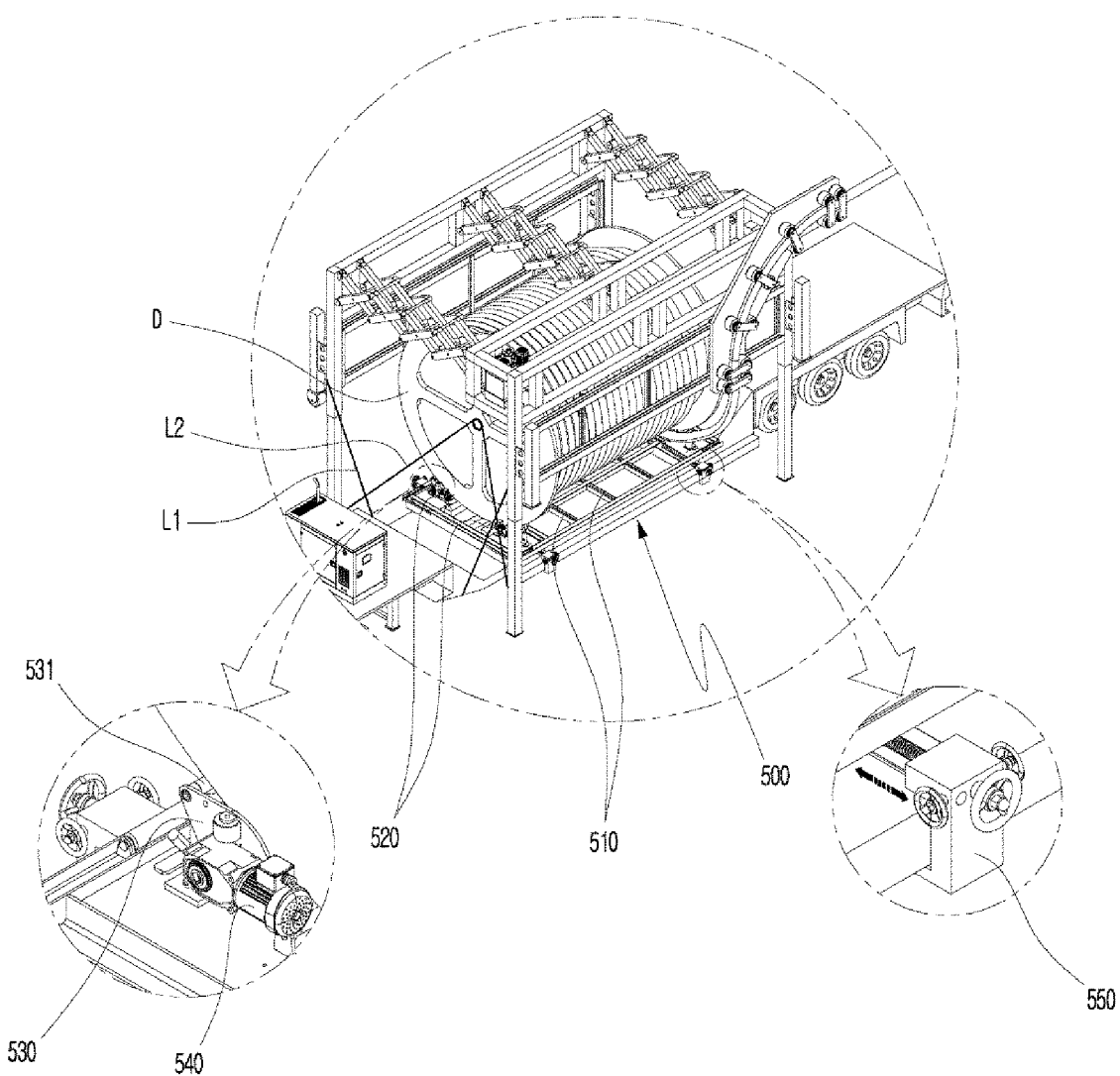
FIG. 9 is a perspective view illustrating a cable drum, a frame unit, a traverse part, and an under roller part according to an embodiment of the present invention.
Figure 10:
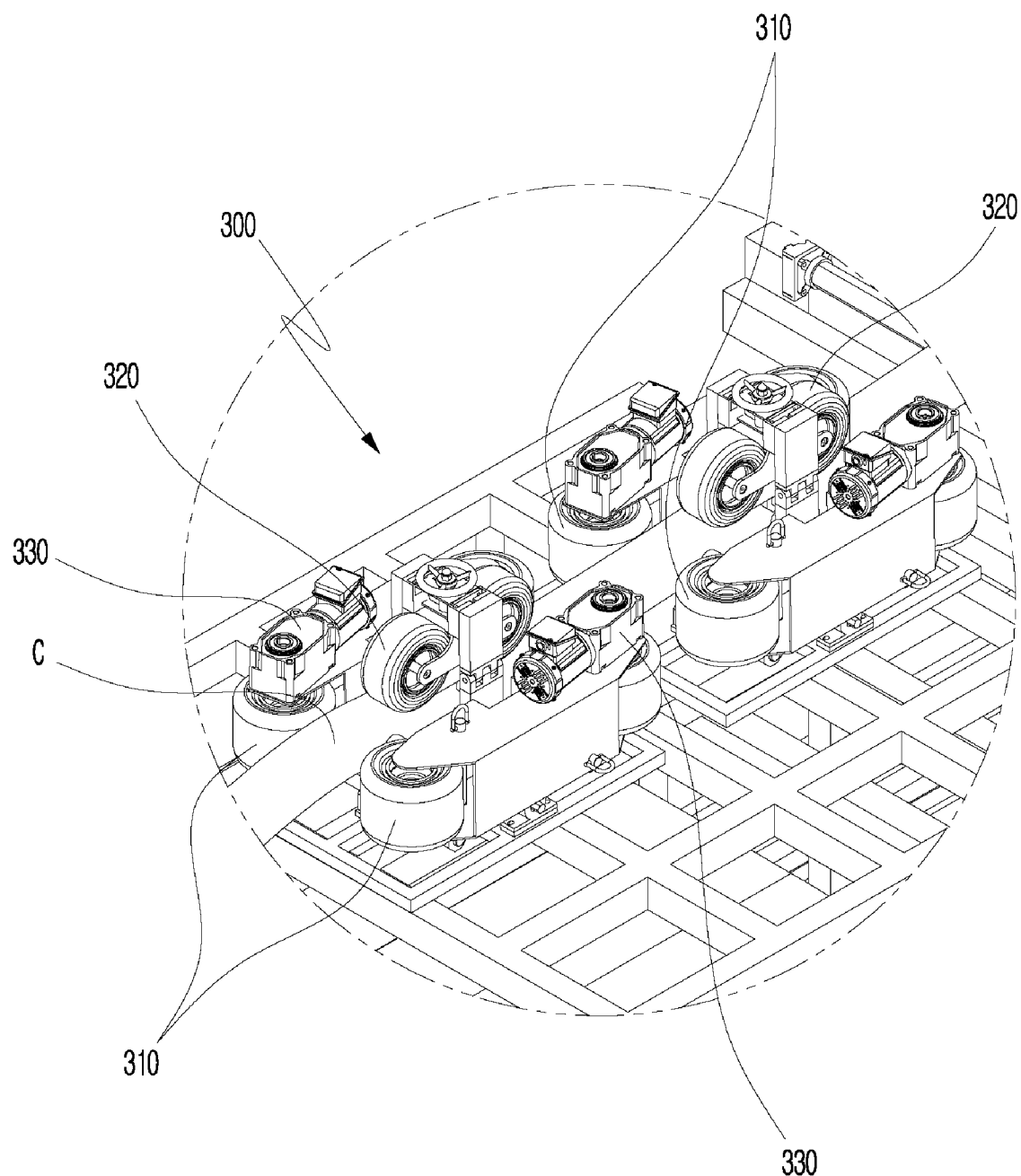
FIG. 10 is a perspective view of a cable unwind part according to an embodiment of the present invention.
Figure 11:
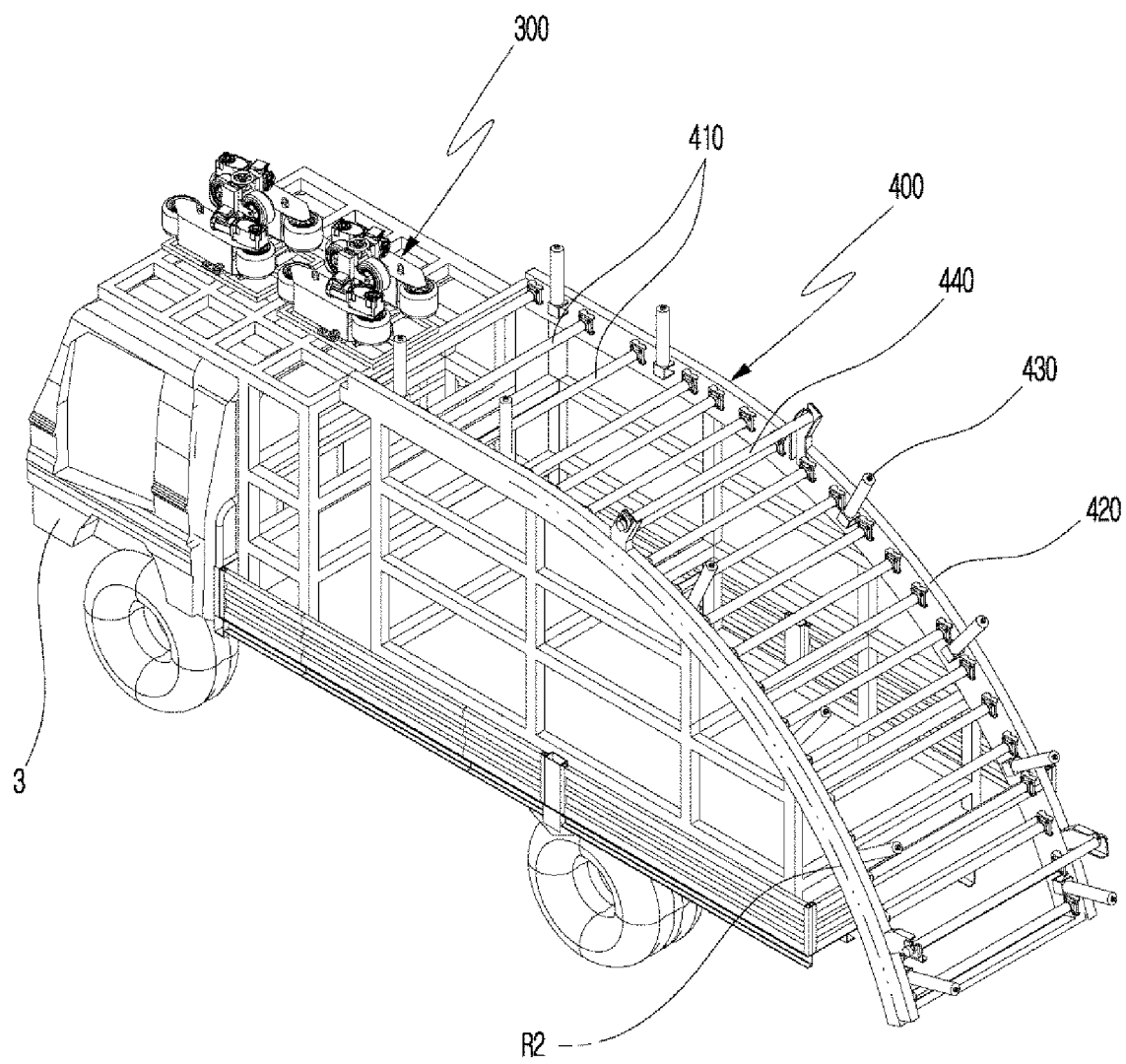
FIG. 11 is a perspective view of a curvature guide part according to an embodiment of the present invention.
Figure 12:
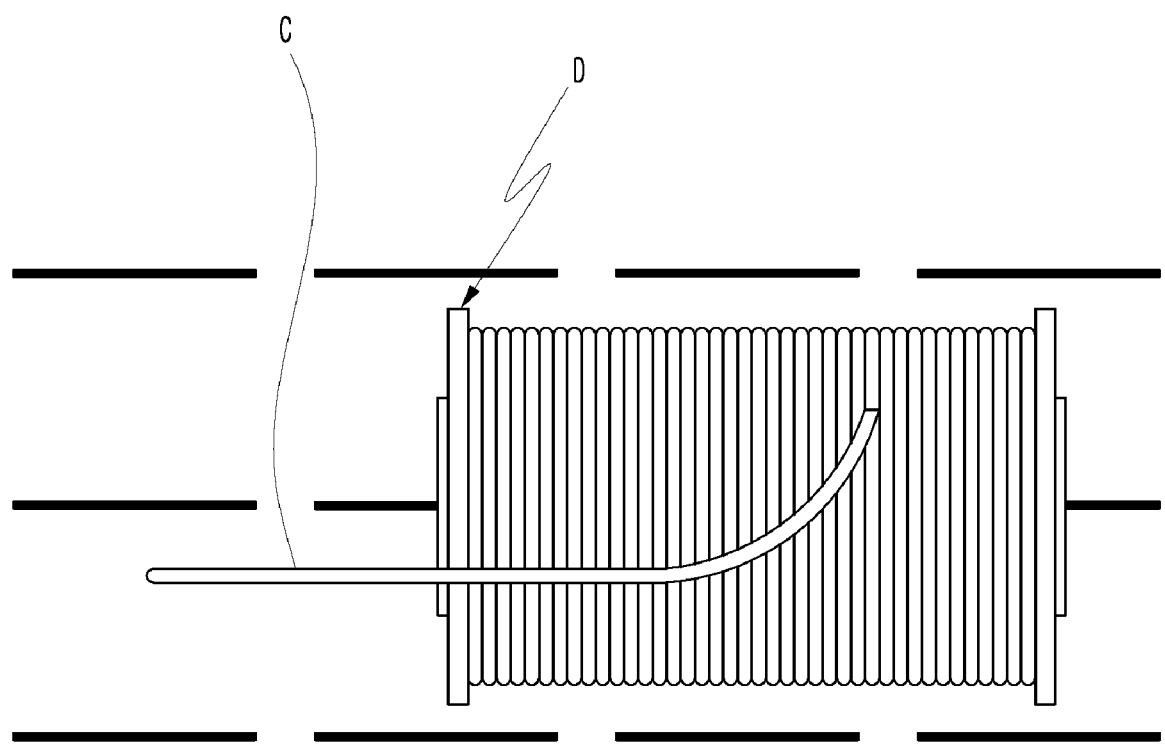
FIG. 12 is a diagram schematically illustrating a process of laying a cable in an axial direction of a cable drum using a cable laying apparatus according to an embodiment of the present invention.

FIG. 2 is a schematic perspective view of a cable laying apparatus according to an embodiment of the present invention. FIG. 3 is a side view of the cable laying apparatus according to an embodiment of the present invention. FIG. 4 is a front view of the cable laying apparatus according to an embodiment of the present invention. FIG. 5 is an operating state diagram illustrating a state in which a traverse part is moved forward along a moving rail part according to an embodiment of the present invention. FIG. 6 is an operating state diagram illustrating a state in which the traverse part is moved backward along the moving rail part according to an embodiment of the present invention. FIG. 7 is a diagram schematically illustrating a process of installing a frame unit according to an embodiment of the present invention. FIG. 8 is an operating state diagram illustrating an operating state of a cable sagging preventer according to an embodiment of the present invention. FIG. 9 is a perspective view illustrating a cable drum, a frame unit, a traverse part, and an under roller part according to an embodiment of the present invention. FIG. 10 is a perspective view of a cable unwinder according to an embodiment of the present invention. FIG. 11 is a perspective view of a curvature guide part according to an embodiment of the present invention. FIG. 12 is a diagram schematically illustrating a process of laying a cable in an axial direction of a cable drum using a cable laying apparatus according to an embodiment of the present invention.

As illustrated in FIGS. 2 to 12, a cable laying apparatus 1000 is configured to lay a cable C in an axial direction of a cable drum D, thereby minimizing a space of the road occupied by the cable drum D during a cable laying process, unlike a related art of laying the cable C in a radial direction of the cable drum D.

The cable laying apparatus 1000 may include a frame unit 100, a traverse part 200, a cable unwinding part 300, a curvature guide part 400, and an under roller part 500.

Here, the frame unit 100 is configured to accommodate the cable drum D therein. The frame unit 100 may be variably installed. That is, a length of the frame unit 100 is selectively variable in a width direction and a height direction such that cable drums D of various sizes may be arranged therein.

The frame unit 100 is configured to guide forward or backward movement of the traverse part 200 while supporting the traverse part 200 when a direction of the cable C unwound from the cable drum D is changed by the traverse part 200.

The frame unit 100 may include a first support frame 110, a second support frame 120, a frame width adjustment part 130, an expansion and contraction adjustment part 140, a first unloading pillar part 150, and a second unloading pillar part 160.

Here, the first support frame 110 includes a pair of first pillar parts 111 spaced apart from each other and a first connection frame 112 connecting the pair of first pillar parts 111.

The second support frame 120 faces the first support frame 110 and includes a pair of second pillar parts 121 spaced apart from each other and a second connection frame 122 connecting the pair of second pillar parts 121.

The two first pillar parts 111 facing each other and the two second pillar parts 121 facing each other form a skeleton of the frame unit 100.

The frame width adjustment part 130 is configured to connect the first support frame 110 and the second support frame 120. That is, one end of the frame width adjustment part 130 may be connected to the first support frame 110 and another end thereof may be connected to the second support frame 120.

The frame width adjustment part 130 has an X-shaped link structure and adjusts the distance between the first support frame 110 and the second support frame 120 when the expansion and contraction adjustment part 140 is operated. That is, the expansion and contraction adjustment part 140 is configured to adjust a width of the frame unit 100 when the frame width adjustment part 130 is operated.

The expansion and contraction adjustment part 140 may reduce or increase the distance between X-shaped ends of at least one of a plurality of frame width adjustment parts 130 to expand or contract the at least one frame width adjustment part 130 while being coupled to the at least one frame width adjustment part 130.

Here, the first support frame 110 includes a seating support frame 114 coupled to the first connection frame 112, and the expansion and contraction adjustment part 140 is placed, supported and fixed on the seating support frame 114.

The seating support frame 114 is coupled to the first connection frame 112 to be located between the first support frame 110 and the second support frame 120. That is, the seating support frame 114 is provided at an inner side of the first support frame 110.

Here, the frame width adjustment part 130 is coupled to the first support frame 110 and the second support frame 120, and the first support frame 110 is coupled to the seating support frame 114. Accordingly, as one end of the frame width adjustment part 130 is coupled to the seating support frame 114 at the inner side of the first support frame 110, a distance between the first support frame 110 and the second support frame 120 may be greatly increased.

The first unloading pillar part 150 is provided at an outside side of the first pillar part 111. The second unloading pillar part 160 is provided at an outside side of the second pillar part 121.

The first unloading pillar part 150 and the second unloading pillar part 160 are configured to facilitate adjustment of the distance between the first support frame 110 and the second support frame 120 during adjustment of the width between the first support frame 110 and the second support frame 120.

A process of adjusting a width of the frame unit 100 will be briefly described with reference to FIG. 7 below. First, the frame unit 100 loaded in a cargo box 2 of a truck is moved to a site at which the cable C is to be laid.

Next, lower portions of the first unloading pillar part 150 and the second unloading pillar part 160 are brought into contact with the road surface by extending the lengths of the first unloading pillar part 150 and the second unloading pillar part 160. Here, the first unloading pillar part 150 is supported and fixed on the road surface, and the lower portion of the second unloading pillar part 160 is provided with wheels to be movable in contact with the road surface.

Next, the distance between the first support frame 110 and the second support frame 120 are increased through the movement of the second unloading pillar part 160 in a state in which the first unloading pillar part 150 and the second unloading pillar part 160 are extended to be supported on the road surface.

Next, the truck on which the frame unit 100 is loaded is moved in the state in which the distance between the first support frame 110 and the second support frame 120 is increased.

Next, the distance between the first support frame 110 and the second support frame 120 is adjusted to dispose the cable drum D inside the frame unit 100. In this case, the distance between the first support frame 110 and the second support frame 120 may be selectively adjusted by operating the expansion and contraction adjustment part 140.

Next, a first lifting frame 113 in the first pillar part 111 and a second lifting frame 123 in the second pillar part 121 are extended downward in a state in which positions of the first support frame 110 and the second support frame 120 are adjusted to a predetermined width, thereby adjusting a total height of the frame unit 100.

Here, the first lifting frame 113 is slidingly moved from the first pillar part 111 and the second lifting frame 123 is slidingly moved from the second pillar part 121 to adjust the height of the frame unit 100. Lower end portions of the first lifting frame 113 and the second lifting frame 123 may be firmly fixed on the road surface through anchor construction. In this case, the first lifting frame 113 and the second lifting frame 123 may be more stably supported and fixed on a trailer bogie 1 through a first lever block L1.

The lengths of the first unloading pillar part 150 and the second unloading pillar part 160 extended in a state, in which the first lifting frame 113 and the second lifting frame 123 are installed, are adjusted to return to an original position thereof.

As described above, the frame unit 100 is configured to be loaded in the cargo box 2 of the truck and thus is easy to move to a site.

The widths and heights of the first support frame 110 and the second support frame 120 are adjustable and thus the frame unit 100 may be used for cable laying work of cable drums D of various sizes.

A lower portion of the first connection frame 112 may be provided with a moving rail part 115.

The traverse part 200 is moved forward and backward along a lengthwise direction of the moving rail part 115 while being coupled to the moving rail part 115 to change a withdrawal direction of the cable C wound around the cable drum D.

The traverse part 200 is configured to change a direction of the cable C withdrawn in the radial direction of the cable drum D to the axial direction of the cable drum D.

The traverse part 200 may include a body part 210 and a guide roller part 220.

Here, the body part 210 is configured to be slidingly moved in the lengthwise direction of the moving rail part 115 while being coupled to the moving rail part 115. That is, the body part 210 is configured to slide to a position of the cable C that is unwound from the cable drum D.

The guide roller part 220 is provided on the body part 210.

The guide roller unit 220 is configured to change a moving direction of the cable C guided in the radial direction of the cable drum D to the axial direction of the cable drum D.

A plurality of guide roller parts 220 are provided to be spaced a predetermined distance from each other. In this case, the plurality of guide roller parts 220 may be spaced apart from each other to achieve a predetermined radius of curvature R1 which is a minimum range of radius of curvature calculated in advance to prevent an influence on insulator integrity of the cable C during pulling.

The guide roller part 220 configured to change the moving direction of the cable C may include direction change guide rollers 221 and separation prevention members 222.

Here, the direction change guide rollers 221 are paired with each other and arranged to be spaced a predetermined distance apart from each other. A direction of the cable C is changed as the cable C is moved between the pair of direction change guide rollers 221 spaced apart from each other.

The separation prevention members 222 connect the pair of direction change guide rollers 221 spaced apart from each other.

The separation prevention members 222 prevent the cable C moved between the pair of direction change guide rollers 221 from being separated upward. That is, the separation prevention members 222 prevent the separation of the cable C during the movement of the cable C through the traverse part 200.

A cable sagging preventer 230 is provided at a rear end of the first connection frame 112.

The cable sagging preventer 230 prevents sagging of the cable C disposed between the traverse part 200 and the cable unwinding part 300 and enables smooth movement of the cable C from the traverse part 200 to the cable unwinding part 300.

In addition, the cable sagging preventer 230 may prevent the cable C from sagging during movement, thereby preventing a sharp change of tension of the cable C.

The cable sagging preventer 230 forms a folding type link structure, and a cable support member 232 is unfolded or folded about a rotation axis 231 according to a position to which the traverse part 200 is moved.

For example, when the traverse part 200 is moved forward along the moving rail part 115, the cable sagging preventer 230 is unfolded about the rotation axis 231, supports the cable C guided by the traverse part 200, and prevents sagging of the cable C guided to the cable unwinding part 300.

When the traverse part 200 is moved backward along the moving rail part 115, the cable sagging preventer 230 is folded about the rotation axis 231 and prevents interference with the traverse part 200. Here, when the traverse part 200 is located at the rear of the moving rail part 115, the distance between the traverse part 200 and the cable unwinding part 300 is short and thus the cable sagging preventer 230 does not need to be used.

The cable sagging preventer 230 prevents sagging of the cable C moved from the traverse part 200 to the cable unwinding part 300 when the distance between the traverse part 200 and the cable unwinding part 300 is large. The cable sagging preventer 230 is capable of supporting, for example, the cable C having a weight of three tons or more.

Here, a rear end of the traverse part 200 may be located at a higher position than the cable unwinding part 300. This prevents bending of the cable C when moved from the traverse part 200 to the cable unwinding part 300 and ensures smooth movement of the cable C.

The under roller part 500 is provided on the trailer bogie 1 and configured to rotate the cable drum D to unwind the cable C from the cable drum D.

The under roller part 500 may include an underframe 510, a drum mounting block 520, a drum lifting jack 530, a power supply 540, and a fixing clamp 550.

Here, the underframe 510 forms an overall appearance of the under roller part 500. That is, the underframe 510 forms a skeleton of the under roller part 500.

The drum mounting block 520 is provided in the underframe 510. The cable drum D is placed on the drum mounting block 520 and prevented from being shaken when placed on the drum mounting block 520. In this case, the cable drum D placed on the drum mounting block 520 may be stably supported and fixed through a second lever block L2.

The drum lifting jack 530 is configured to lift the cable drum D placed on the drum mounting block 520. The drum lifting jack 530 includes a drum rotary roller 531 and thus is capable of rotating the cable drum D lifted from the drum mounting block 520.

The cable C wound around the cable drum D may be withdrawn by the drum rotary roller 531.

Here, a turning force of the drum rotary roller 531 for rotating the cable drum D may be provided from the power supply 540. The power supply 540 may be a motor.

The fixing clamp 550 is supported and fixed on a side of the trailer bogie 1. That is, the fixing clamp 550 is supported and fixed on the side of the trailer bogie 1 and thus the underframe 510 may be firmly fixed on the trailer bogie 1. The fixing clamp 550 has a variable length and thus may be supported and fixed on the trailer bogie 1 of various widths.

The cable unwinding part 300 is spaced apart from the rear of the traverse part 200. This cable unwinding part 300 is configured to pull the cable C guided by the traverse part 200. That is, when the cable C wound around the cable drum D is transferred to a required place, the cable unwinding part 300 may adjust tension of the cable C that is being transferred and ensures smooth supply of the cable C to the required place.

The cable unwinding part 300 may include side pressure rollers 310 and an upper pressure roller 320.

Here, the side pressure rollers 310 paired with each other are arranged to be spaced a predetermined distance apart from each other. The cable C when moved to a space between the pair of side pressure rollers 310 is pulled by the side pressure rollers 310. That is, the side pressure rollers 310 are rotated by a drive motor 330 while pressing both sides of the cable C and transfer the cable C guided to an entrance of the cable unwinding part 300 to an exit of the cable unwinding part 300.

A plurality of side pressure rollers 310 may be provided at predetermined intervals in a lengthwise direction.

The upper pressure roller 320 is rotated in a moving direction of the cable C and guides the movement of the cable C moved between the side pressure rollers 310. Similarly, a plurality of upper pressure rollers 320 may be provided in the lengthwise direction.

As described above, the cable unwinding part 300 is configured to unwind the cable C in a state in which the cable C is pressed.

Here, the cable unwinding part 300 is configured to adjust tension of the moving cable C in connection with a rotational speed of the power supply 540 for control of a rotational speed of the cable drum D. That is, the tension of the cable C that is being moved may be adjusted and the cable C may be smoothly transferred to a required place without being damaged through control of an unwinding speed of the cable unwinding part 300 and the rotational speed by the power supply 540.

The curvature guide part 400 is located at the rear of the cable unwinding part 300.

The curvature guide part 400 is configured to guide a moving direction of the cable C supplied from the cable unwinding part 300. That is, the curvature guide part 400 is configured to smoothly transfer the cable C supplied from the cable unwinding part 300 to a required place.

The curvature guide part 400 has a curved shape and thus is capable of smoothly and stably supplying the cable C to the required place.

The curvature guide part 400 may include a cable support roller 410, curvature frames 420, a side separation prevention roller 430, and an upper separation prevention roller 440.

The cable support roller 410 is configured to move the cable C downward in a state in which the cable C supplied from the cable unwinding part 300 is placed thereon. A plurality of cable support rollers 410 may be provided at predetermined intervals.

In addition, the curvature frames 420 paired with each other to be spaced apart from each other have a curved shape and support both ends of the cable support roller 410. As described above, both ends of the cable support roller 410 are rotated while being supported by the curvature frames 420, thereby moving the cable C.

Here, a radius of curvature R2 of the curvature frames 420 of the curved shape is preferably 3.8 to 4.2 meters. More preferably, the radius of curvature R2 of the curvature frames 420 is four meters.

As described above, the curvature frames 420 have a predetermined radius of curvature, and thus the cable C may be smoothly supplied from the cable unwinding part 300 to the required place.

The side separation prevention roller 430 is provided on the curvature frame 420. The side separation prevention roller 430 prevents the cable C, which is being moved from the cable support roller 410, from being separated from the curvature frame 420.

The upper separation prevention roller 440 connects the curvature frames 420 spaced apart from each other and prevents the cable C from being moved above the curvature frame 420. The side separation prevention roller 430 and the upper separation prevention roller 440 prevent separation of the cable C and guide the cable C to the cable support roller 410, thereby smoothly supplying the cable C to the required place.

The cable laying apparatus 1000 may further include a cable laying speed measuring part (not shown).

The cable laying speed measuring part is configured to identify in real time a laying speed of the cable C that is being laid.

The cable laying speed measuring part may identify in real time the laying speed of the cable C, which is being laid, for example, on the basis of moving speed information of the cable C provided from a first sensor part (not shown) installed in the traverse part 200, to measure a moving speed of the cable C passing through the traverse part 200 and a second sensor part (not shown) installed in the curvature guide part 400 to measure a moving speed of the cable C passing through the curvature guide part 400.

As described above, the cable laying apparatus 1000 according to the present invention is capable of laying the cable C in the axial direction of the cable drum D without additional unloading work, thereby facilitating work of laying the cable C. In addition, the cable C may be laid in the axial direction of the cable drum D and thus a road occupancy space may be minimized during the laying of the cable C.

Furthermore, the cable laying apparatus 1000 is capable of laying the cable C in the axial direction of the cable drum D and thus the width of the cable drum D can be increased, thereby satisfying a need for a large-scale and long-span cable C.

Figure 13:
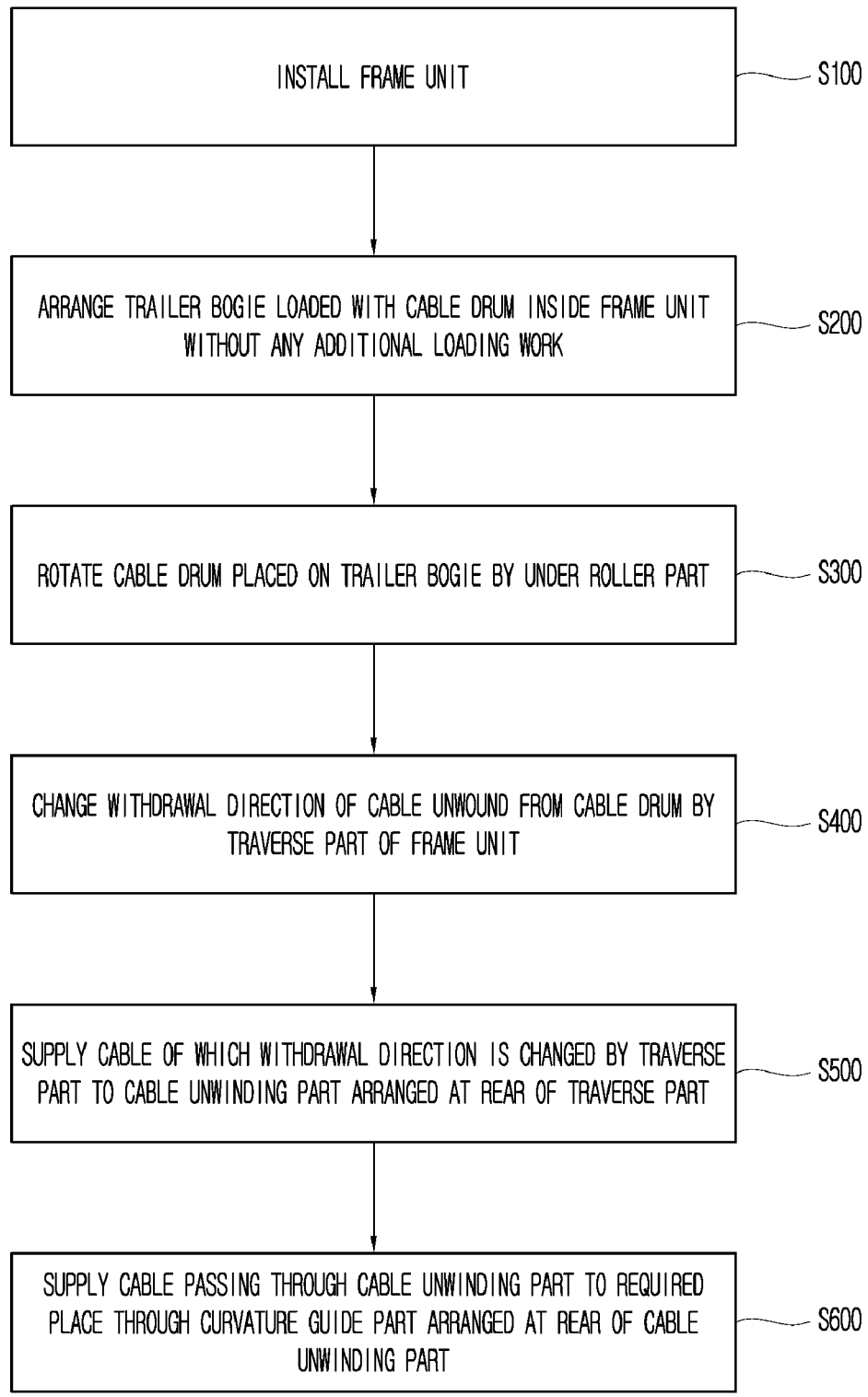
FIG. 13 is a flowchart of a cable laying process according to an embodiment of the present invention.
Figure 14:
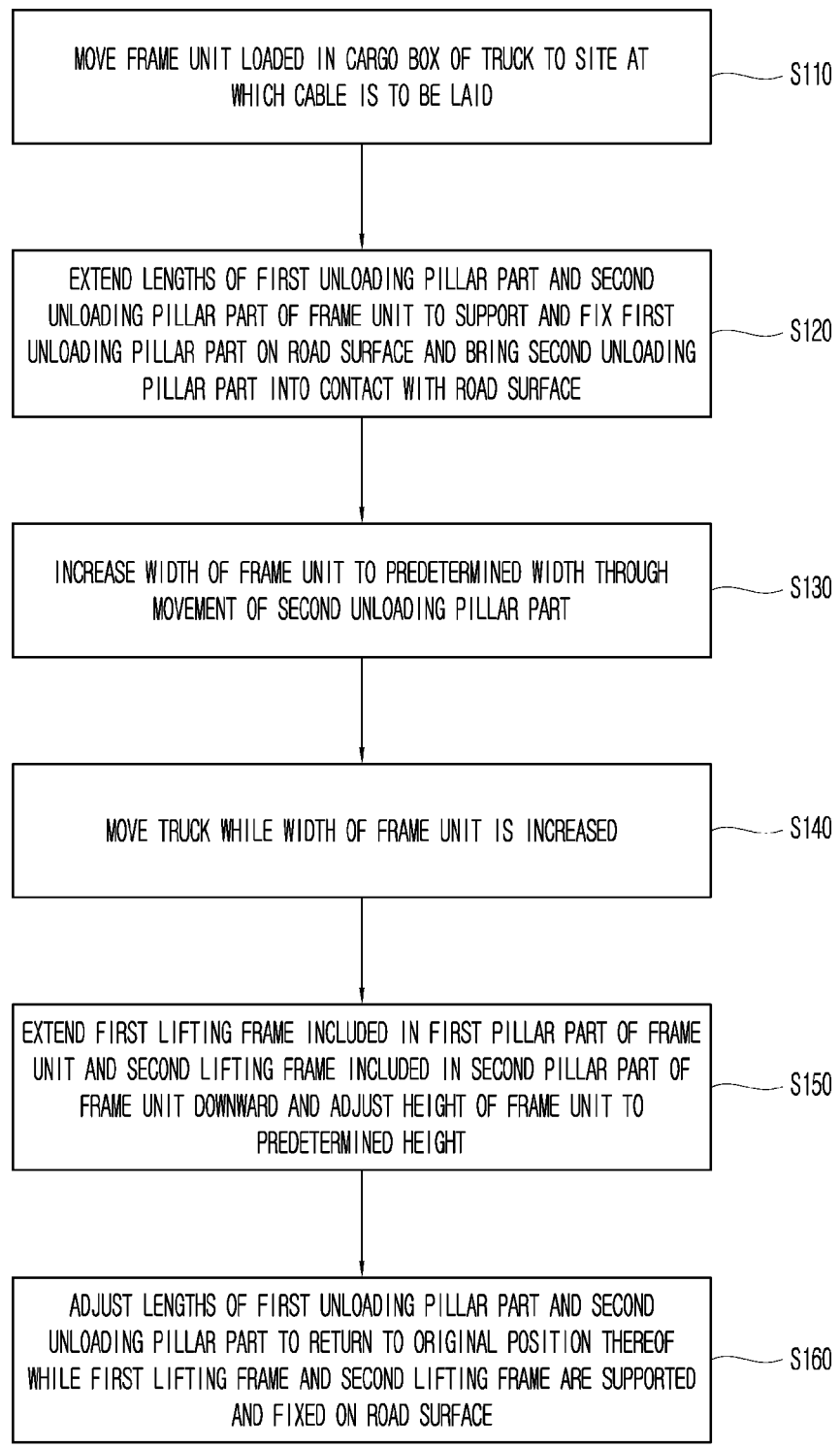
FIG. 14 is a flow chart of a process of installing a frame unit according to an embodiment of the present invention.

FIG. 13 is a flowchart of a cable laying process according to an embodiment of the present invention. FIG. 14 is a flow chart of a process of installing a frame unit according to an embodiment of the present invention.

A method of laying the cable C using the cable laying apparatus 1000 capable of changing a direction of the cable C will be described in detail with reference to FIG. 13 below.

First, the frame unit 100 is installed (S100).

Here, the frame unit 100 is installed in a required place at which the cable C is to be laid. As a width and height of the frame unit 100 are variable, the width and height of the frame unit 100 may be adjusted to match a size of the cable drum D arranged inside the frame unit 100.

An installation method of the frame unit 100 will be described in detail later.

Next, the trailer bogie 1 loaded with the cable drum D is arranged inside the frame unit 100 without any additional loading work (S200).

Next, the cable drum D placed on the trailer bogie 1 is rotated by the under roller part 500 (S300).

Next, a withdrawal direction of the cable C unwound from the cable drum D is changed by the traverse part 200 included in the frame unit 100 (S400).

Next, the cable C, the withdrawal direction of which is changed by the traverse part 200, is supplied to the cable unwinding part 300 arranged at the rear of the traverse part 200 (S500).

Finally, the cable C passing through the cable unwinding part 300 is supplied to the required place through the curvature guide part 400 arranged at the rear of the cable unwinding part 300 (S600).

Here, when the cable C is unwound from the cable drum D by the under roller part 500, an end of the cable C passing through the traverse part 200, the cable unwinding part 300, and the curvature guide part 400 may be pulled by wire connected to a winch provided in a manhole or a required place in a power outlet.

The end of the cable C passing through the traverse part 200 of the frame unit 100 may be safely moved to the cable unwinding part 300 and the curvature guide part 400 using connection rope or the like. That is, the end of the cable C may be prevented from falling to the ground of the site using the connection rope during connection of the end of the cable C to the cable unwinding part 300 by the traverse part 200.

In addition, a moving vehicle 3 provided with the curvature guide part 400 for guiding the cable C to a required place in the process of laying the cable C is maintained a predetermined distance from the trailer bogie 1. Thus, sagging of the cable C may be prevented and smoothly supplied to the required place. The moving vehicle 3 is also provided with not only the curvature guide part 400 but also the cable unwinding part 300 and thus the curvature guide part 400 and the cable unwinding part 300 may be easily arranged and installed.

For example, an operation of the under roller part 500 may be controlled using a wireless control device or a manipulator (not shown) included in the frame unit 100. Here, not only an operation of the under roller part 500 but also an operation of the cable unwinding part 300 may be controlled by the manipulator. Operations of the under roller part 500 and the cable unwinding part 300 are not limited to the above-mentioned method and may be controlled in various ways.

Referring to FIG. 14, an installation process of the frame unit 100 will be described in detail below.

First, the frame unit 100 loaded in the cargo box 2 of the truck is moved to a site at which the cable C is to be laid (S110).

Next, lengths of the first unloading pillar part 150 and the second unloading pillar part 160 of the frame unit 100 are extended to support and fix the first unloading pillar part 150 on the road surface and bring the second unloading pillar part 160 into contact with the road surface (S120).

Next, a width of the frame unit 100 is increased to a predetermined width through movement of the second unloading pillar part 160 (S130).

In this case, the width of the frame unit 100 is adjusted such that the trailer bogie 1 loaded with the cable drum D may be aligned inside the frame unit 100.

Next, the truck is moved while the width of the frame unit 100 is increased (S140).

Next, the first lifting frame 113 in the first pillar part 111 of the frame unit 100 and the second lifting frame 123 in the second pillar part 121 of the frame unit 100 are extended downward and a height of the frame unit 100 is adjusted to a predetermined height (S150).

In this case, the height of the frame unit 100 is adjusted such that the trailer bogie 1 loaded with the cable drum D may be aligned inside the frame unit 100.

Lastly, while the first lifting frame 113 and the second lifting frame 123 are supported and fixed on the road surface, the lengths of the first unloading pillar part 150 and the second unloading pillar part 160 are adjusted to return to the original position thereof (S160).

As described above, a cable laying method according to the present invention uses the cable laying apparatus 1000 configured to lay the cable C in the axial direction of the cable drum D and thus the cable C may be conveniently laid while minimizing a road occupancy space.

However, the embodiments set forth herein are merely example embodiments of the present invention and thus the scope of the present invention is not limited thereto.

Effects of a cable laying method using a cable laying apparatus capable of changing a direction of a cable according to the present invention will now be described.

According to the present invention, the cable laying apparatus is capable of laying a cable in an axial direction of a cable drum to minimize a space of the road occupied by the cable drum during the laying of the cable, unlike a related art of laying a cable in a radial direction of a cable drum.

In addition, according to the present invention, the cable laying apparatus is capable of laying a cable in the axial direction of the cable drum and thus a width of the cable drum can be increased, thereby satisfying a need for a large-scale and long-span cable.

As described above, when the cable is laid using the cable laying apparatus capable of changing a direction of the cable, cable laying work can be easily performed even when the size of the cable drum is large.

Effects of the present invention are not limited thereto and should be understood to include all effects derivable from the configurations of the invention described in the detailed description or claims of the present invention.

The foregoing description of the present invention is merely intended to provide examples, and it will be understood by those of ordinary skill in the art that the present invention may be easily embodied in many different forms without departing from the technical scope or essential features of the invention. Therefore, it should be understood that the embodiments described above are illustrative examples in all respects and are not restrictive. For example, each component described as a single type may be implemented in a distributed manner, and similarly, components described as distributed may be implemented in a combination form.

The scope of the present invention is defined in the following claims, and it should be construed that all changes or modifications derived from the meaning and scope of the claims and equivalents to the claims are included in the scope of the present invention.

What is claimed is:

1. A cable laying method using a cable laying apparatus capable of changing a direction of a cable, the cable laying method comprising:
   installing a frame assembly;
   arranging a trailer bogie loaded with a cable drum inside the frame assembly;
   rotating the cable drum, which is loaded in the trailer bogie, by an under-roller frame;
   changing a withdrawal direction of the cable unwound from the cable drum by a traverse panel of the frame assembly;
   supplying the cable, the withdrawal direction of which is changed by the traverse panel, to a cable unwinding roller assembly located at a rear side of the traverse panel; and
   supplying the cable passing through the cable unwinding roller assembly to a required place through a curvature guide located at a rear side of the cable unwinding roller assembly,
   wherein the traverse panel is configured to change the direction of the cable withdrawn in a radial direction of the cable drum to an axial direction of the cable drum,
   wherein the installing of the frame assembly comprises:
   moving the frame assembly loaded on a cargo box of a truck to a site at which the cable is to be laid; and
   extending lengths of a first unloading pillar and a second unloading pillar of the frame assembly to support and fix the first unloading pillar on a road surface and bring the second unloading pillar into contact with the road surface.

2. The cable laying method of claim 1, wherein the installing of the frame assembly further comprises increasing a width of the frame assembly to a predetermined width by a movement of the second unloading pillar.

3. The cable laying method of claim 2, wherein the installing of the frame assembly further comprises:
   moving the truck while the width of the frame assembly is increased; and
   extending a first lifting frame included in a first pillar of the frame assembly and a second lifting frame included in a second pillar of the frame assembly downward and adjusting a height of the frame assembly to a predetermined height.

4. The cable laying method of claim 3, wherein the installing of the frame assembly further comprises adjusting the lengths of the first unloading pillar and the second unloading pillar to return to original lengths thereof while the first lifting frame and the second lifting frame are fixed on the road surface.

5. The cable laying method of claim 2, wherein the increasing of the width of the frame assembly comprises adjusting the width of the frame assembly to arrange the trailer bogie loaded with the cable drum in the frame assembly.

6. The cable laying method of claim 1, wherein, during the changing of the withdrawal direction of the cable, the traverse panel is slidingly moved in a lengthwise direction of the frame assembly and configured to change the withdrawal direction of the cable.

7. The cable laying method of claim 1, wherein the cable unwinding roller assembly and the curvature guide are installed in a moving vehicle.

8. A cable laying method using a cable laying apparatus capable of changing a direction of a cable, the cable laying method comprising:
   installing a frame assembly;
   arranging a trailer bogie loaded with a cable drum inside the frame assembly;
   rotating the cable drum, which is loaded in the trailer bogie, by an under-roller frame;
   changing a withdrawal direction of the cable unwound from the cable drum by a traverse panel of the frame assembly;
   supplying the cable, the withdrawal direction of which is changed by the traverse panel, to a cable unwinding dev roller assembly ice located at a rear side of the traverse panel; and
   supplying the cable passing through the cable unwinding roller assembly to a required place through a curvature guide located at a rear side of the cable unwinding roller assembly,
   wherein the traverse panel is configured to change the direction of the cable withdrawn in a radial direction of the cable drum to an axial direction of the cable drum, and
   wherein a cable sagging preventer provided at a rear side of the frame assembly is unfolded about a rotation axis to support the cable in a state in which the traverse panel is moved forward along the frame assembly, and is folded about the rotation axis to prevent interference with the traverse panel in a state in which the traverse panel is moved backward along the frame assembly.

9. A cable laying method using a cable laying apparatus capable of changing a direction of a cable, the cable laying method comprising:
   installing a frame assembly;
   arranging a trailer bogie loaded with a cable drum inside the frame assembly;
   rotating the cable drum, which is loaded in the trailer bogie, by an under-roller frame;
   changing a withdrawal direction of the cable unwound from the cable drum by a traverse panel of the frame assembly;
   supplying the cable, the withdrawal direction of which is changed by the traverse panel, to a cable unwinding roller assembly located at a rear side of the traverse panel; and
   supplying the cable passing through the cable unwinding roller assembly to a required place through a curvature guide located at a rear side of the cable unwinding roller assembly,
   wherein the traverse panel is configured to change the direction of the cable withdrawn in a radial direction of the cable drum to an axial direction of the cable drum, and
   wherein a rear end of the traverse panel is located at a position higher than that of the cable unwinding roller assembly.

\* \* \* \* \*